July 7, 1942.  P. A. RAICHE  2,288,840
METHOD OF MAKING RUBBER GLOVES
Filed July 26, 1940  2 Sheets-Sheet 1

INVENTOR
Paul A. Raiche
BY Nathaniel Frucht
ATTORNEY

July 7, 1942.                P. A. RAICHE                 2,288,840
                    METHOD OF MAKING RUBBER GLOVES
                   Filed July 26, 1940      2 Sheets-Sheet 2

INVENTOR
Paul A. Raiche
BY Nathaniel Frucht
ATTORNEY

Patented July 7, 1942

2,288,840

UNITED STATES PATENT OFFICE 2,288,840

METHOD OF MAKING RUBBER GLOVES

Paul A. Raiche, Providence, R. I., assignor to Devoe Rubber Company, a corporation of Rhode Island Application July 26, 1940, Serial No. 347,685

8 Claims. (Cl. 18—58)

My present invention relates to the rubber industry, and has particular reference to the manufacture of rubber gloves.

It is the principal object of my invention to provide a rubber glove having roughened or corrugated finger tips.

Another object of my invention is to manufacture roughened tip rubber gloves by means of an improved and simplified procedure.

An additional object of my invention is to reduce the time of manufacture of roughened tip rubber gloves to a minimum.

With the above and other objects and advantageous features in view, my invention consists of a novel method of manufacture and a novel article produced thereby, as disclosed in the detailed specification following, in conjunction with the accompanying drawings, and defined in the claims appended thereto.

It has been found desirable to provide rubber gloves, or gloves made of elastic material of similar nature and characteristics, having integral roughened finger tips, in a simple, inexpensive manner. To this end, I provide a novel form which is dipped into rubber solution, the rubber being natural or synthetic and the preferred solution being latex, whereby a glove of predetermined thickness of material and having roughened finger tips is produced in a single dipping procedure.

Figures 1, 4:
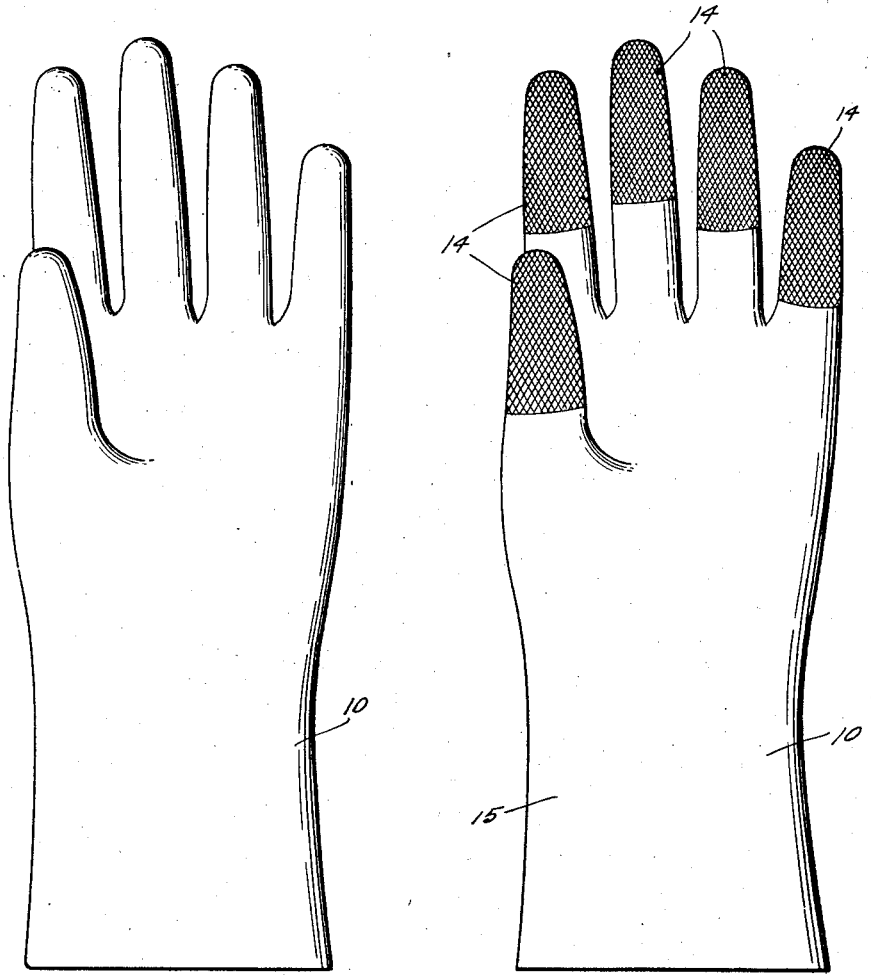
Fig. 1 is a view of a dipping glove blank, preferably of porcelain.
Fig. 4 is a view of the form of Fig. 1, with a roughened tip on each finger.
Figure 2:
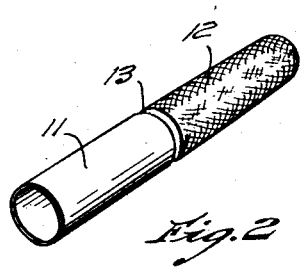
Fig. 2 is a perspective view of a roughened tip form, preferably of metal tubing.

To this end, I first utilize a standard type glove dipping form, preferably of porcelain, such as designated 10 in Fig. 1, and an auxiliary tip dipping form 11, see Fig. 2, preferably of thin tubular metal. The form 11 has a roughened tip 12 with a terminal annular groove 13, the roughening being preferably produced by cross corrugations.

Figure 3:
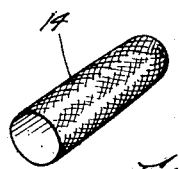
Fig. 3 is a perspective view of a roughened tip.
Figures 5, 6:
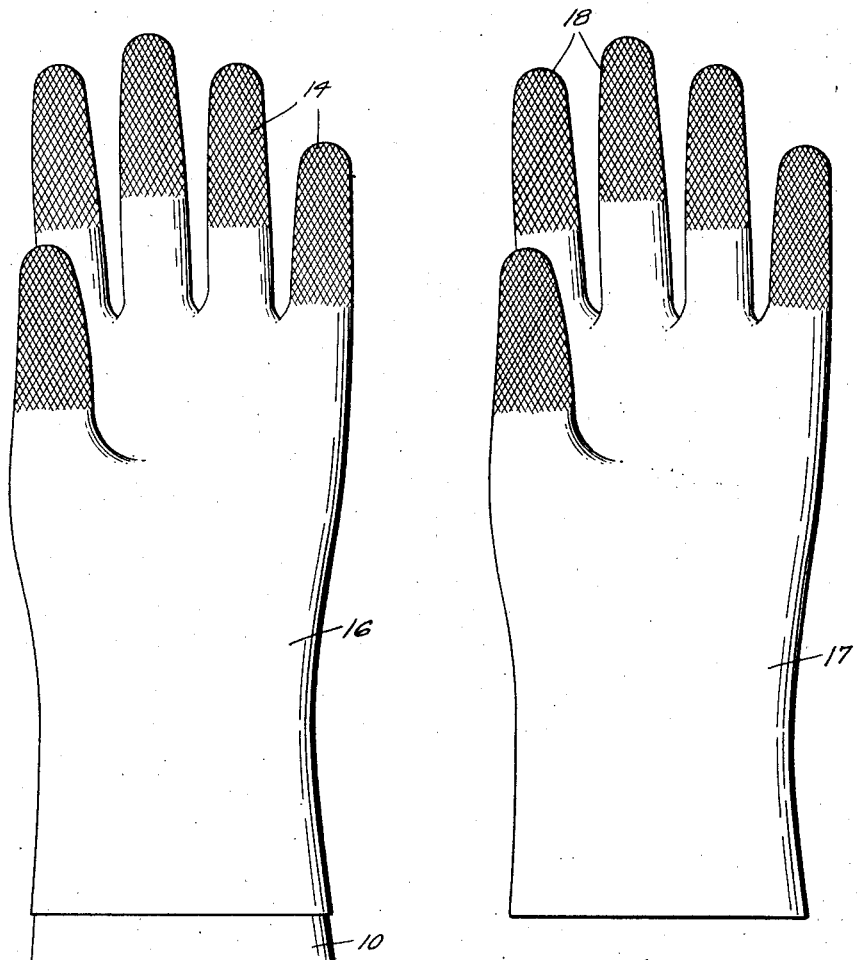
Fig. 5 is a view of a complete form, consisting of a rubber glove with roughened tips, mounted on a glove form such as shown in Fig. 1, the rubber being treated to prevent adhesion.
Fig. 6 is a view of the novel product.

The form 11 is dipped into latex solution, or the like, to form a corrugated tip 14, see Fig. 3; the tips are preferably partly or fully vulcanized, and are mounted on the blank of Fig. 1, as illustrated in Fig. 4, to provide an intermediate form 15.

This intermediate form is now dipped in the latex or other solution, and the resulting coating is preferably partly or fully vulcanized and is stripped from the intermediate form to provide a glove base, which has the tips 14 joined to and integral with the outer coating. This glove base is now reversed or turned inside out and is replaced on the blank 10, whereby the roughened or corrugated tips are on the outside. The glove base is now treated to prevent adhesion, preferably by means of a chemical treatment such as by using bromide or iodine solution, or by using a physical separator such as powdered soapstone or the like.

The treated glove base on the initial form 10 now provides the complete glove form 16, which is dipped in latex solution, and coagulating solution to provide a glove coating, the coating being dried preferably by air, and stripped from the complete form, and being vulcanized either before or after stripping. The coating is now turned inside out to form the completed product 17, which has integral roughened or corrugated finger tips 18. Any desired number of gloves may now be made, using complete forms 16.

The manufacturing procedure is thus greatly simplified, the manufacturing cost is reduced, and the resulting product is improved. Instead of latex solution, any solution of rubber or rubber compound or substitute may be used, and the coating may be made by spraying as well as by dipping. Any desired arrangement of dipping or coating mechanism may be utilized.

The invention may be applied to any article of rubber or the like which has a roughened or thickened portion, or a portion having a design or a special configuration, as the disclosed procedure permits the manufacture of dipping or coating forms with suitable local or localized areas of special surface character to provide final products of integral character having corresponding local or localized areas of special surface character.

If it be preferred that the local or localized areas be of different or distinctive color, such results are readily accomplished; for gloves, the roughened tips may be of one color, and the glove body, using the intermediate form of Fig. 4, may thus be made of a different color material which is integral with the previously formed tips.

While I have described a specific manufacturing procedure, and have illustrated specific shapes and designs of forms, it is obvious that the size, shape, material and arrangement of the blank or initial forms, the intermediate, and the final forms may be made to suit the requirements for different rubber and rubber type articles, without departing from the spirit and the scope of the invention as defined in the appended claims.

I claim:

1. The method of forming a rubber glove with roughened finger tips, comprising the steps of dipping roughened tip forms in rubber solution to obtain roughened tips, stripping the tips therefrom, mounting the stripped tips on the fingers of a glove form, dipping the said tipped glove form in rubber solution to obtain a glove base, stripping and reversing the glove base and mounting the reversed base on a glove form, treating the mounted reversed base to prevent adhesion, and dipping the treated mounted reversed base to obtain the glove product and roughened finger tips.

2. The method of forming a rubber glove with roughened finger tips, comprising the steps of dipping roughened tip forms in rubber solution to obtain roughened tips, at least partially vulcanizing the tips, stripping the tips therefrom, mounting the stripped tips on the fingers of a glove form, dipping the said tipped glove form in rubber solution to obtain a glove base, at least partially vulcanizing the glove base, stripping and reversing the glove base and mounting the reversed base on a glove form, treating the mounted reversed base to prevent adhesion, and dipping and treated mounted reversed base to obtain the glove product with roughened finger tips.

3. The method of forming a rubber glove with roughened finger tips, comprising the steps of dipping roughened tip forms in rubber solution to obtain roughened tips, stripping the tips therefrom, mounting the stripped tips on the fingers of a glove form, dipping the said tipped glove form in rubber solution to obtain a glove base, stripping and reversing the glove base and mounting the reversed base on a glove form, treating the mounted reversed base to prevent adhesion chemically, and dipping the treated mounted reversed base to obtain the glove product with roughened finger tips.

4. The method of forming a rubber glove with roughened finger tips, comprising the steps of dipping roughened tip forms in rubber solution to obtain roughened tips, stripping the tips therefrom, mounting the stripped tips on the fingers of a glove form, dipping the said tipped glove form in rubber solution to obtain a glove base, stripping and reversing the glove base and mounting the reversed base on a glove form, treating the mounted reversed base to prevent adhesion with a surface physical separator, and dipping the treated mounted reversed base to obtain the glove product with roughened finger tips.

5. The method of forming a rubber glove with roughened finger tips, comprising the steps of dipping roughened tip forms in rubber solution to obtain roughened tips, at least partially vulcanizing the tips, stripping the tips therefrom, mounting the stripped tips on the fingers of a glove form, dipping the said tipped glove form in rubber solution to obtain a glove base, at least partially vulcanizing the glove base, stripping and reversing the glove base and mounting the reversed base on a glove form, treating the mounted reversed base chemically to prevent adhesion, and dipping the treated mounted reversed base to obtain the glove product with roughened finger tips.

6. The method of forming a rubber glove with roughened finger tips, comprising the steps of dipping roughened tip forms in rubber solution to obtain roughened tips, at least partially vulcanizing the tips, stripping the tips therefrom, mounting the stripped tips on the fingers of a glove form, dipping the said tipped glove form in rubber solution to obtain a glove base, at least partially vulcanizing the glove base, stripping and reversing the glove base and mounting the reversed base on a glove form, treating the mounted reversed base with a surface physical separator to prevent adhesion, and dipping the treated mounted reversed base to obtain the glove product with roughened finger tips.

7. The method of forming a dipped rubber article, having a selected portion with a surface design, comprising the steps of mounting a design form on a rubber dipping form, dipping in rubber solution to obtain a base, stripping and reversing the base, treating the stripped reversed base to avoid adhesion, and using the treated stripped reversed base as a dipping form.

8. The method of forming a dipped rubber article having a selected portion with a surface design, comprising the steps mounting a design form on a rubber dipping form, dipping in rubber solution to obtain a base, at least partially vulcanizing the base, stripping and reversing the base, treating the stripped reversed base to avoid adhesion, and using the treated stripped reversed base as a dipping form.

PAUL A. RAICHE.